UNITED STATES PATENT OFFICE.

HERMANN STERN, OF MUNICH, GERMANY.

PRODUCTION OF CAOUTCHOUC-LIKE BODIES.

1,218,713. Specification of Letters Patent. Patented Mar. 13, 1917.

No Drawing. Original application filed July 17, 1914, Serial No. 851,486. Divided and this application filed July 30, 1915. Serial No. 42,791.

*To all whom it may concern:*

Be it known that I, HERMANN STERN, a subject of the German Emperor, residing at Munich, in the Kingdom of Bavaria, German Empire, have invented certain new and useful Improvements in the Production of Caoutchouc-like Bodies, of which the following is a specification.

This invention relates to the production of a vulcanized caoutchouc-like body and consists essentially in causing sulfur dichlorid to react on a ketone, or a mixture of a ketone and an aliphatic alcohol or an aliphatic ether. The present application is a division of my co-pending application for patent filed July 17, 1914, Serial Number 851,486.

In place of a simple ketone a mixed or compound ketone may be used or several simple or several mixed or compound ketones may be used as well as a mixture of simple ketones with mixed or compound ketones. To the ketones used may also be added an aliphatic ether or an aliphatic alcohol. The reaction between the sulfur dichlorid and the ketone or the mixtures containing ketone is very powerful. Therefore, in order to prevent the reaction from becoming too violent, the sulfur dichlorid may be added in very small quantities at a time, or the mixture may be cooled during the reaction.

The following example will illustrate how a vulcanized caoutchouc-like body may be made according to this process.

About 6.75 kilograms of sulfur dichlorid is added in small quantities to a mixture of 4.6 kilograms of alcohol and 5.8 kilograms of acetone. At the commencement of the reaction cooling may be applied if found necessary, and a reflux condenser may be used for this purpose. By the reaction a lump of vulcanized caoutchouc-like body is produced weighing about 10 kilograms. It is separated from any remaining liquid, is then neutralized and is ready for use. It is insoluble in alcohol, ether, benzene and chloroform.

This product is useful in the rubber industry being used with native rubber, in this respect taking the place of the various sulfochlorinated oils now in use, being superior to the latter in elasticity and tensile strength.

The ketones and alcohols used in carrying out the present invention are those which are liquid at ordinary temperature.

What I claim as new is:—

1. In the art of making a vulcanized caoutchouc-like body, the improvement which consists in adding dichlorid of sulfur to a mixture containing a ketone capable of yielding isoprene and caoutchouc and allowing the two bodies to react on each other.

2. In the art of making a vulcanized caoutchouc-like body, the improvement which consists in adding sulfur dichlorid to a ketone and an alcohol and allowing said bodies to react on each other.

In testimony whereof I have hereunto affixed my signature in presence of two witnesses.

HERMANN STERN.

Witnesses:
W. S. SPIEGELBERG,
ARTHUR GUBE.